US007320120B2

(12) United States Patent
Rajarajan et al.

(10) Patent No.: US 7,320,120 B2
(45) Date of Patent: Jan. 15, 2008

(54) PLUGGABLE NOTATIONS AND SEMANTICS FOR VISUAL MODELING ELEMENTS

(75) Inventors: Vij Rajarajan, Redmond, WA (US); Casey L. Kiernan, Kirkland, WA (US); Stewart P. MacLeod, Woodinville, WA (US); Shawn E. Oberst, Maple Valley, WA (US)

(73) Assignee: Microsoft Corporation, Redmond, WA (US)

( * ) Notice: Subject to any disclaimer, the term of this patent is extended or adjusted under 35 U.S.C. 154(b) by 832 days.

(21) Appl. No.: 09/742,761

(22) Filed: Dec. 20, 2000

(65) Prior Publication Data

US 2002/0120784 A1    Aug. 29, 2002

(51) Int. Cl.
    G06F 9/44        (2006.01)
    G06F 3/048       (2006.01)
(52) U.S. Cl. .................. 717/104; 717/105; 715/771
(58) Field of Classification Search ............ 717/104, 717/105, 171, 143; 707/104; 709/203; 715/964–970, 715/771

See application file for complete search history.

(56) References Cited

U.S. PATENT DOCUMENTS

| | | | |
|---|---|---|---|
| 5,130,932 A | 7/1992 | Kaihara et al. | |
| 5,838,973 A * | 11/1998 | Carpenter-Smith et al. | 717/105 |
| 5,907,704 A * | 5/1999 | Gudmundson et al. | 717/100 |
| 5,956,023 A | 9/1999 | Lyle et al. | |
| 5,958,012 A * | 9/1999 | Battat et al. | 709/224 |
| 5,983,218 A * | 11/1999 | Syeda-Mahmood | 707/3 |
| 6,041,143 A * | 3/2000 | Chui et al. | 382/232 |
| 6,054,987 A | 4/2000 | Richardson | |
| 6,069,634 A | 5/2000 | Gibson | |
| 6,222,537 B1 * | 4/2001 | Smith et al. | 715/762 |
| 6,233,537 B1 | 5/2001 | Gryphon et al. | |
| 6,343,377 B1 * | 1/2002 | Gessner et al. | 717/171 |
| 6,353,448 B1 * | 3/2002 | Scarborough et al. | 345/744 |
| 6,363,404 B1 | 3/2002 | Dalal et al. | |
| 6,384,843 B1 | 5/2002 | Harel | |
| 6,418,421 B1 | 7/2002 | Hurtado et al. | |
| 6,425,120 B1 | 7/2002 | Morgnaelli et al. | |
| 6,430,538 B1 * | 8/2002 | Bacon et al. | 705/9 |
| 6,448,968 B1 | 9/2002 | Pfister et al. | |

(Continued)

OTHER PUBLICATIONS

Quatrani, "Visual Modeling with Rational Rose and UML", Addison-Wesley, 3rd Printing, Apr. 1998.*

(Continued)

Primary Examiner—Li B. Zhen
(74) Attorney, Agent, or Firm—Workman Nydegger

(57) ABSTRACT

Described is a method, system and data structures to logically separate the notations from the semantics of model element objects into separate code components, and to enable subsequent re-association of a selected notation with a selected semantic. Various notations and semantics from different providers may be combined. The invention may be implemented in a Visual Modeling Framework which defines the API set and/or interfaces to which the semantic and notation objects conform, and allows a notation and a semantic to be plugged into each other to create a model element, thereby allowing pluggable notations and pluggable semantics. A paradigm server may load a selected semantic and notation component, combine them, and present the combination to the framework as a model element. The paradigm server may be a pluggable component, having specialized knowledge for validating whether a semantic object can be used in a paradigm and combined with a notation.

35 Claims, 10 Drawing Sheets

U.S. PATENT DOCUMENTS

| | | | |
|---|---|---|---|
| 6,470,482 | B1 | 10/2002 | Rostoker et al. |
| 6,499,035 | B1 * | 12/2002 | Sobeski .................. 707/103 R |
| 6,515,656 | B1 | 2/2003 | Wittenburg et al. |
| 6,535,912 | B1 | 3/2003 | Anupam et al. |
| 6,542,595 | B1 * | 4/2003 | Hemzal ................ 379/201.03 |
| 6,611,725 | B1 | 8/2003 | Harrison et al. |
| 6,615,172 | B1 * | 9/2003 | Bennett et al. ............. 704/257 |
| 6,678,882 | B1 * | 1/2004 | Hurley et al. ............... 717/121 |
| 6,745,381 | B1 * | 6/2004 | Ehnebuske et al. ......... 717/100 |
| 6,898,782 | B1 * | 5/2005 | Brodsky et al. ............ 717/104 |

OTHER PUBLICATIONS

Tony Clark, Andy Evans, Robert France, Stuart Kent and Bernard Rumpe, "Response to UML 2.0 Request for Information," Dec. 1999, pp. 1-27.*

Erika T. Neal, "A New UML-Compatible Object Relationship Notation (ORN)," Apr. 2000, ACM, pp. 179-183.*

Andersson et al., "Interactive Techniques for Visual Design," *Topics in Surface Modeling*, Chapter 6, American Mathematical Society, pp. 95-113 (1992).

Blake, Jeffrey, "Software Through Pictures vs. Paradigm Plus," *Advanced Systems Magazine*, pp. 84-88 (Jun. 1994).

Khriss et al., "Automating the Synthesis of UML StateChart Diagrams from Multiple Collaboration Diagrams," *The Unified Modeling Language, UML '98: Beyond the Notation, First International Workshop*, pp. 132-147 (Jun. 3-4, 1998).

Paech B., "On the Role of Activity Diagrams in UML—A User Task Centered Development Process for UML," *The Unified Modeling Language, UML '98: Beyond the Notation, First International Workshop*, pp. 267-277 (Jun. 3-4, 1998).

Microsoft Computer Dictionary Fifth Edition. Copyright 2002. p. 757.

* cited by examiner

PLUGGABLE NOTATIONS AND SEMANTICS FOR VISUAL MODELING ELEMENTS

FIELD OF THE INVENTION

The present invention is generally directed to computer systems, and more particularly to visualization and modeling in computer systems.

BACKGROUND OF THE INVENTION

Visualization and modeling software is extensively used in industry. Visualization generally refers to computer tools for viewing existing layouts, such as for viewing a representation of a network topology, an electrical wiring system or various other things that are designed. Visualization has general relevance in various applications, e.g., viewing a network topology is a scenario that is applicable to many different products. Modeling refers to computer tools used to design things, such as software, databases, integrated circuits, CAD/CAM applications and the like. Thus, in general, in visualization, a user looks at interconnected model elements placed on a viewing surface. In modeling, a user places the model elements on a work surface and connects them together in some manner. The semantics of connecting two or more model elements using other model elements is the fundamental operation in modeling and visualization.

However, existing visualization and modeling tools have a number of drawbacks, including that the developers of the tools have made them closed and proprietary. For example, the file formats that store the designs are proprietary. Similarly, the rules and semantics of connecting two or more model elements together are embedded in the modeling tool. For example, an integrated circuit design tool will allow or disallow a connection between two elements such as a node and a connecting arc based on some hard-coded knowledge about those elements. As a consequence, the tool that has the hard-coded rules and semantics, and the model elements, typically come from the same vendor, or at least come from sources having detailed knowledge of one another, resulting in a closed and proprietary tool in which independent software vendors (ISVs) or other third parties cannot participate. For example, the model elements of one vendor cannot be used with the modeling software of another vendor. Thus, if someone were to create a model diagram using one standard, (e.g., IDEF), they cannot plug-in another standard's (e.g., UML) model elements and view them as a UML diagram.

SUMMARY OF THE INVENTION

Briefly, the present invention provides a method and system that logically separate the notation (e.g., visual representation such as an icon, image or shape, e.g., circle, a triangle or a line) of a model element object, from the semantics of that notation, (e.g., what the notation represents or means in its current environment). The present invention, implemented in a Visual Modeling Framework (VMF), separates these two logical concepts into separate code components, whereby various notations and semantics from different providers may be combined. VMF defines the API set/interfaces to which pluggable semantic and notation objects conform, and allows a notation and a semantic to be plugged into or otherwise associated with each other to create a model element, thereby allowing pluggable notations. VMF also allows pluggable semantics, e.g., to enable UML notations to be used to design a complex software diagram, yet switch between 'Semantic' objects for Visual Basic and 'Semantic' objects in C++.

In one implementation, a paradigm server loads the semantic component and the notation component of the user's choice, combines them, and presents the combination to the VMF as a model element. In general, paradigm servers define a particular discipline of modeling, e.g., software design or database design. The paradigm server components are also preferably pluggable components, having specialized knowledge that allows them to validate if a semantic object can be used in a paradigm and combined with a given notation. For example, a software design semantic object may not be plugged with any notation object if the paradigm being used in the tool is for database design. Allowing for such pluggable notations and semantics, which are in turn encapsulated in pluggable paradigms, provides a rich architecture that allows for broader functionality and customization than currently available.

Other advantages will become apparent from the following detailed description when taken in conjunction with the drawings, in which:

DETAILED DESCRIPTION OF THE PREFERRED EMBODIMENT

Exemplary Operating Environment

Figure 1:
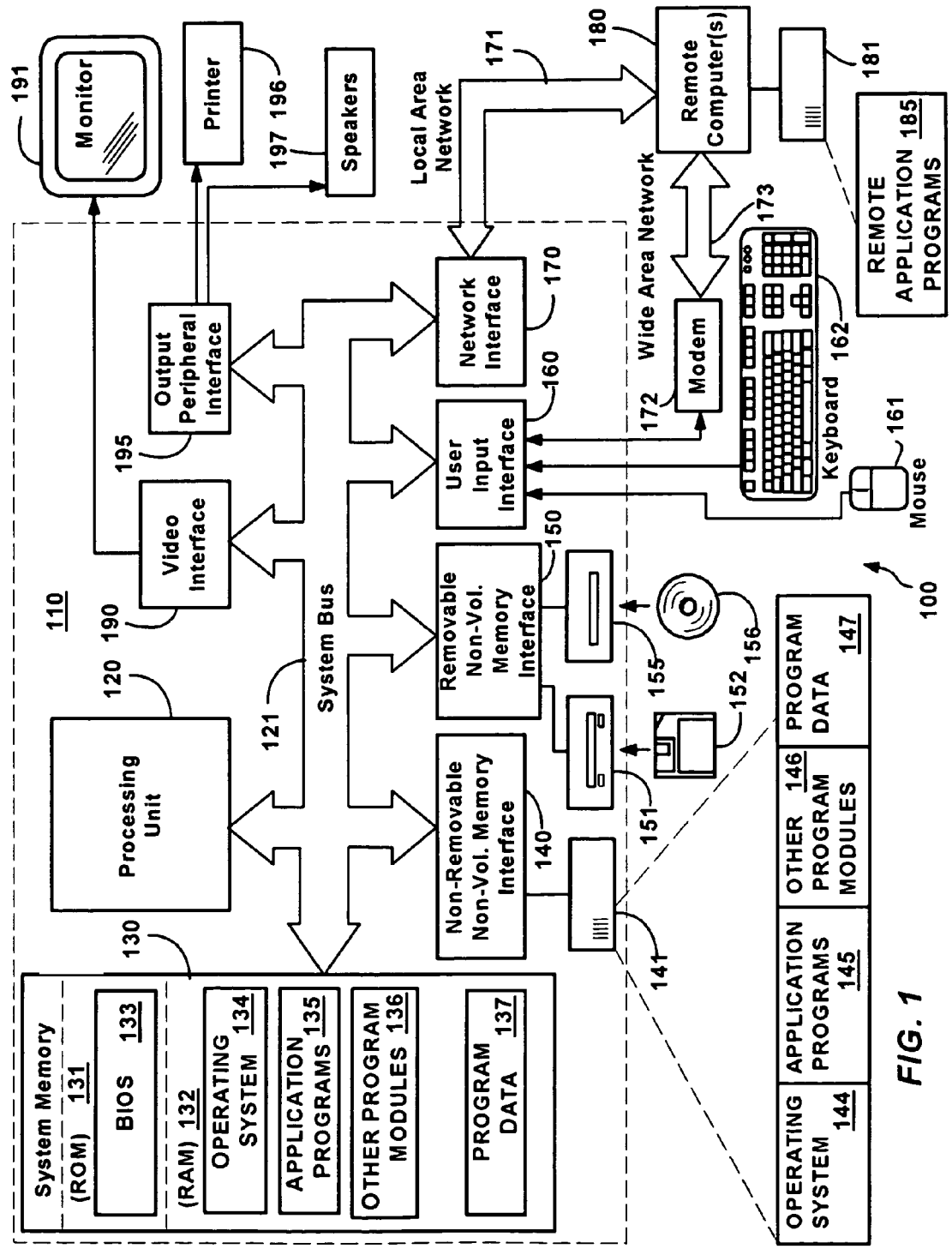
FIG. 1 is a block diagram representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs different numbers herein to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Visual Modeling Framework

Figure 2:
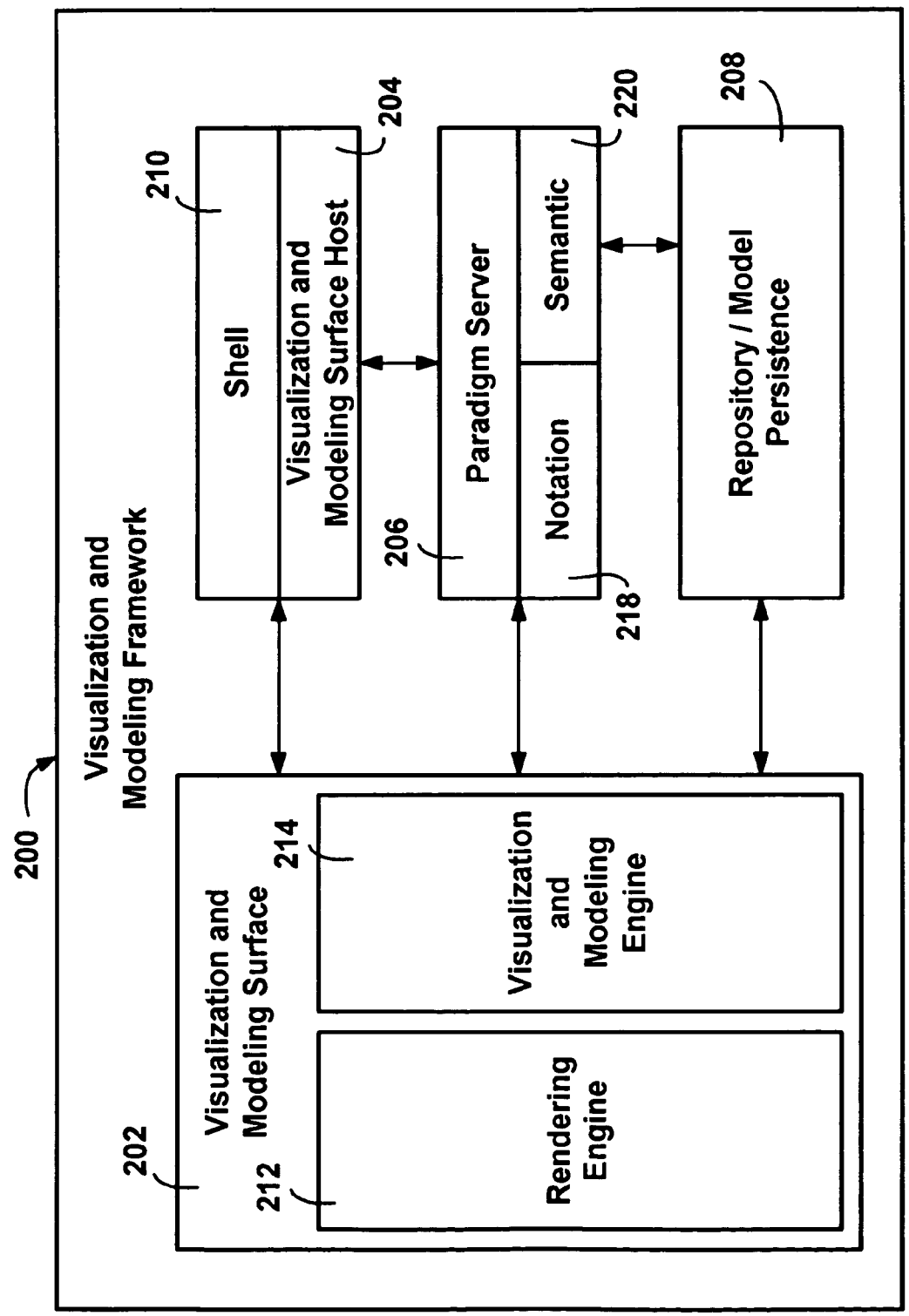
FIG. 2 is a block diagram generally representing a visualization and modeling framework (VMF) in which separate notations and semantics may be associated into a model element in accordance with an aspect of the present invention.
Figure 3:
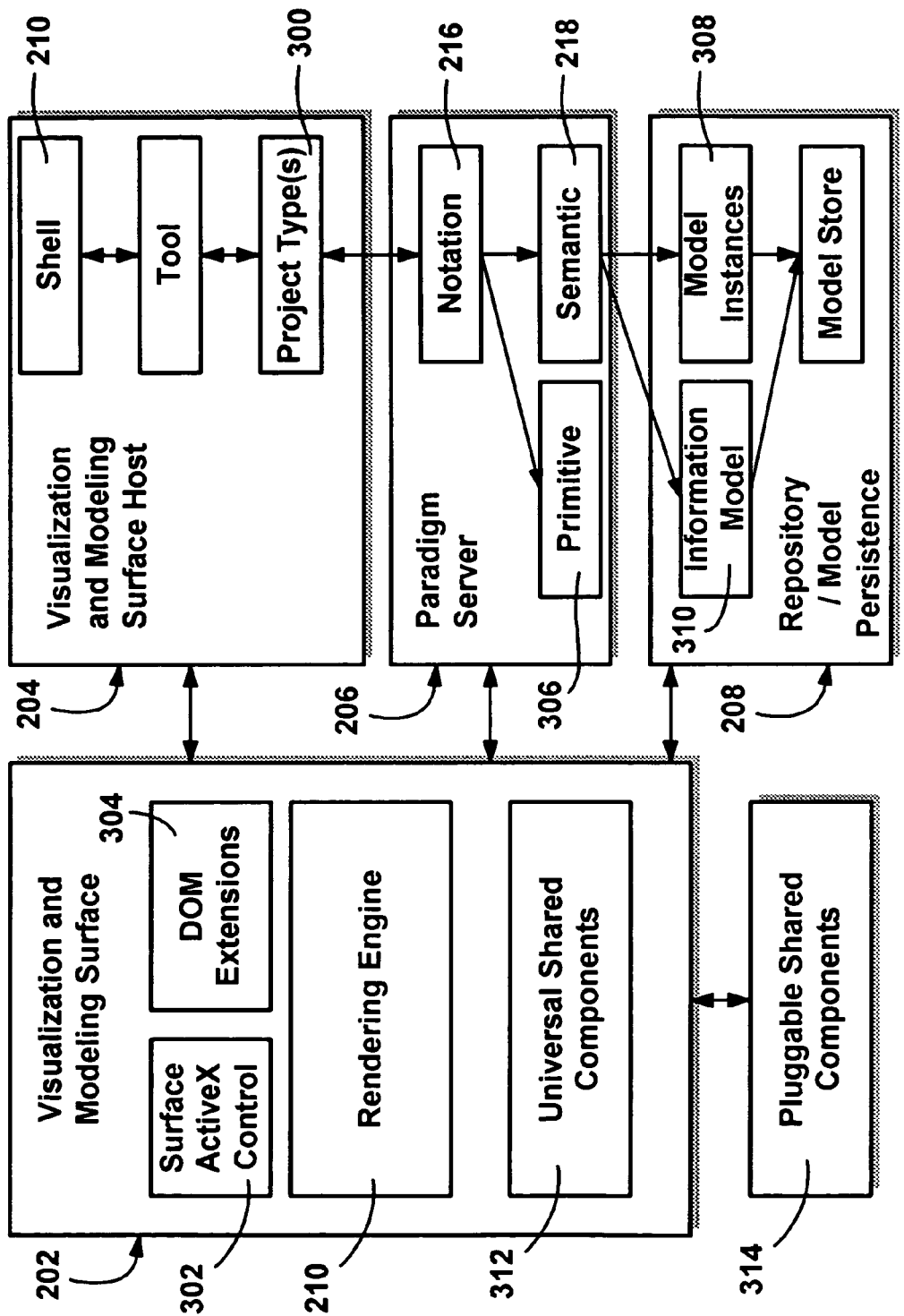
FIG. 3 is a block diagram generally representing exemplary components in the VMF by which separate notations and semantics may be associated into a model element in accordance with an aspect of the present invention.
Figure 4:
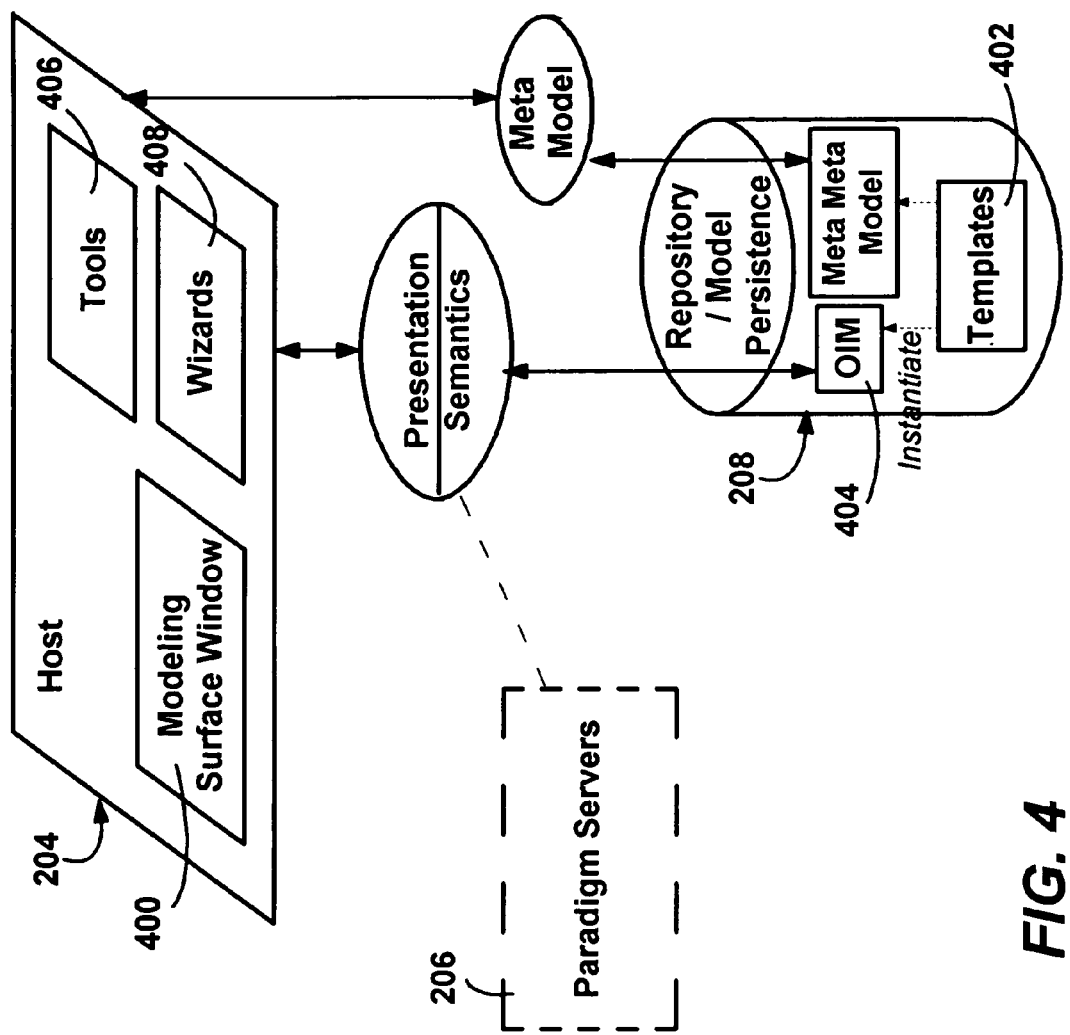
FIG. 4 is a block diagram generally representing a physical architecture of the VMF in accordance with an aspect of the present invention.

As generally represented in FIGS. 2-4, the Visualization and Modeling Framework (VMF) is a component-based framework 200 for visualization and modeling tools. VMF is a general-purpose modeling tool having a paradigm-independent surface 202 capable of modeling numerous kinds of model elements. Nevertheless, unlike other diagramming tools, VMF is still capable of enforcing model semantics and constraints.

A minimum VMF architecture requires the surface 202, a host 204 and a paradigm server 206. Model persistence, such as in the form of a repository 208, is optional, but is very likely in many modeling scenarios, for example, to maintain properties and other information for model elements. In keeping with the present invention as described below, the VMF components such as the surface 202, core graphic components and other components are designed to be reusable across modeling paradigms. For example, new model elements may be introduced by registering new paradigm servers (e.g., ActiveX® controls). Similarly, new project types may be introduced, (e.g., as ActiveX® servers). Some or all of the components that comprise the VMF 200 may be incorporated into an operating system, such as the operating system 135 (FIG. 1) of the computer 110.

The VMS host 204 is a tool that uses the services of the VMF 200 to solve a problem for the end user. In one straightforward situation, this tool may be a stand-alone executable program, wizard or add-in, with a specific problem domain for which it will provide solutions. For example, a simple host can be just a tool that hosts the surface 202 and a known paradigm server 206, e.g., a type-modeling tool may be created that utilizes a Unified Modeling Language (UML) paradigm server to model Visual Basic (VB) classes, and then generates the code for those VB classes.

A more complex host may be a generic modeling tool that may be hosted through hosting layers in a variety of host shells, such as the shell 210 (FIG. 2). Such a modeling tool may model virtually anything, using one or more registered paradigms and one or more project types 300 (FIG. 3) dedicated to solving problems utilizing those paradigms in different problem domains. More complex hosts, such as a generic modeling tool, can be hosted in a number of shells (including VS, IE, MMC, and Access) through thin hosting layers to provide shell independence. As described below, these more-complex hosts may also implement the project types 300 (like VB project types) to provide scenario-based tool support for individual sets of paradigms without compromising paradigm independence.

In the VMF architecture represented in FIGS. 2 and 3, the visualization and modeling surface 202 comprises an HTML rendering engine 212 (e.g., browser and/or editor) such as found in Microsoft Corporation's Internet Explorer product. The surface 202 thus provides a complete HTML interpreter along with HTML editing capabilities. For example, the surface supports dynamic models built from Visual Basic and C++ ActiveX® controls and behaviors, as well as static models rendered in XML/VML.

The surface 202 (which in one preferred implementation represented in FIGS. 6-9 comprises an ActiveX® control) provides the actual drawing canvas on which model elements are arranged to form diagrams, represented in FIG. 4 as the modeling surface window 400. As described below, the surface 202 also acts as the central communication point for model elements to communicate with each other, including facilitating interconnection negotiations as further described in U.S. patent application Ser. No. 09/742,909 entitled "*Negotiated Interconnection of Visual Modeling Elements,*" assigned to the Assignee of the present invention and hereby incorporated by reference.

Most of the properties, methods and events of the surface 202 are directed to adding, editing and deleting model elements, and to managing the interactions between them. A preferred modeling surface, to be provided to third parties such as independent software vendors, is further described in U.S. patent application Ser. No. 09/742,819, now U.S. Pat. No. 6,795,089, entitled "Dynamic, Live Surface and Model Elements for Visualization and Modeling," assigned to the Assignee of the present invention and hereby incorporated by reference. Note that while this surface 202 is rich, consistent and straightforward to use, the surface 202 provides a set of defined interfaces, and is thus capable of being replaced by an arbitrary component that supports the same set of interfaces.

The surface 202 also includes or is otherwise connected to a Visualization and Modeling Engine (VME) 214 that provides additional support for rendering and editing models beyond that available via the rendering engine 212. In other words, via extensions, the VME 214 provides capabilities that the rendering engine 212 does not natively provide. For example, a more sophisticated way to determine whether one model element is above or in close proximity to another model element on the modeling surface, known as four-point hit testing, is not natively handled by the rendering engine 212, but is instead provided by the VME 214.

In one particular implementation using ActiveX® controls as represented in FIG. 3 and FIGS. 6-9, a VMS host such as the host 204 may site the surface ActiveX® control 302, which provides standard ActiveX® interfaces to access the rendering engine 212. Any ActiveX® capability that the rendering engine 212 does not currently provide natively, such as the above-described four-point hit testing, are also provided by this surface ActiveX® control 302. Alternatively, thin clients may access most of the same capabilities of the VMS ActiveX® control with Dynamic HTML, utilizing Document Object Model (DOM) extensions 304.

As also represented in FIGS. 2-4, paradigm servers 206 provide notations and semantics to hosts, such as the VMS host 204, independent from the functional use of those notations and semantics. In one implementation, a paradigm server 206 may comprise an ActiveX® control server dedicated to providing and controlling the model elements of a single modeling paradigm. Notations and semantics, separated in accordance with one aspect of the present invention, are described below.

A primitive server 306 shown in FIG. 3 (such as the graphic primitive server) may also provide any shared tools that multiple notations will likely wish to implement. For example, most model elements have some text which can often be formatted, and it would be inefficient for every paradigm server to contain its own text-formatting dialog and toolbar or in-place editing textbox. The graphic primitive server thus may contain these shared tools. By way of example, one graphic primitive server (e.g., 306 of FIG. 3) provides base shapes such as lines, polygons and ellipses from which more complex shapes may be constructed, i.e., it provides basic shapes to utilize as building blocks for the more complex notation objects of a paradigm server (described below). Typical examples of controls provided by this server include base nodes ranging from simple non-sizable icons to more complex polygons or ellipses and base arcs ranging from simple node centered non-routable single segment arcs to routable multi-segment arcs with semantic adornments. These building blocks may encapsulate both shared graphical behavior such as drawing, zooming, resizing, moving, hovering, and selecting, as well as shared modeling behavior inherent in the communication protocols with the surface, the host, semantic objects, and other notation objects (described below). Thus, many complex behaviors such as zooming, resizing, moving and surface communication protocols are built directly into these primitive shapes, which, as can be readily appreciated, significantly simplifies the building of a notation server.

As further represented in FIG. 2, model persistence 208 may be provided as a generic pluggable component for a given tool. This component may be provided by the surface 202 or through a component known to the paradigm server 206. Persistence may be meta-model driven through information models or the paradigm server may already know the schema. More reusable paradigm servers will persist through a published persistence interface on a persistence component provided by the surface 202.

Model persistence is optional. If persisted, VMF models are preferably persisted in the Open Information Model (OIM) in the persistence/repository 208, and therefore can automatically be used by existing and future tools. OIM is based on the Unified Modeling Language (UML), which is a graphical language for visualizing and modeling. A suitable persistence stream for VMF is XML/VML, however additional persistence formats, such as repository objects or database record sets, may be provided to the host. Moreover, in VMF, models are persisted through published COM interfaces for OIM and UML, whereby the actual persistence component may be easily changed from repository 208, to database tables, to XML, or the like, without effecting the paradigm servers. This component architecture maximizes flexibility and extensibility and increases the preservation of investment in the individual components as the applications of those components change.

The model persistence/repository 208 is designed to be a point of interoperability for software vendors. Any information placed in the repository 208 can be read, updated and extended by any application with appropriate access to that repository 208. Since update access is exclusively through published (e.g., COM interfaces), adding application-specific extensions through new repository interfaces does not effect those applications already leveraging the existing interfaces.

As represented in FIGS. 3 and 4, the repository 208 may contain one or more models and/or templates 402, each of which may be composed of packages for organization. Templates 402 are static instances of models in the repository 208. They are usually designed to be examples or good starting points for modeling a vertical market domain, however they can also be design patterns (model structure templates) that can be utilized by wizards to apply a standard architectural design to a model. Many templates can be built dynamically as the user needs them through wizards.

A model instance 308 includes model elements, diagrams and the projections of those model elements onto those diagrams. If the model is persisted in a versioned repository 208 then a model instance includes the versions of model elements, diagrams and projections. Information models 310 specify the schema for persisting model instances. They are meta-models of model instances and contain meta-data about those instances. For example, the repository OIM 404 specifies the interfaces for persisting types, components and database entities. The schema of a particular database may comprise a model instance 308 of this information model 310.

As also represented in FIG. 3, the surface component 202 may provide universal shared components 312 that can be shared by hosts, such as to accomplish selection, hovering, zooming, and printing functions. Larger tools that may not be required by hosts and are thus optional may be provided as separate, pluggable components 314. This reduces the footprint requirements of smaller VMF applications that may not need these components, and the physical separation also makes it easy to provide several alternative implementations of these components. By way of example, model-independent persistence, such as XML/VML persistence, is a good candidate for a pluggable component because not every host will need every persistence mechanism, and indeed, some will not require a VMF provided persistence mechanism at all. As another example, automatic graph layout is a suitable candidate for a pluggable, shared component because layout algorithms are substantially different for different classes of modeling paradigms, and yet a single layout algorithm is often useful for many or all modeling paradigms within a class. Automatic layout is further described in U.S. patent application Ser. No. 09/742,781 entitled "*Incremental and Interruptible Layout of Visual Modeling Elements*," assigned to the Assignee of the present invention and hereby incorporated by reference.

FIG. 3 also shows a representation of project types, which plug into the host 204, e.g., through an application object. Project types may be UML-like collaborations described in the OIM of the repository 208. More particularly, each project type is a collaboration of modeling paradigms, tools 406 (FIG. 4), wizards 408, command bars and templates, registered in the repository 208 and designed to be used together to accomplish a task. Command bars comprise menu bars and toolbars, and act as the hooks that link the project type into the hosting environment (the surface 202 and shell 210). The tools 406 and wizards 408 of a project type 300 may be accessed through its command bars.

Project types can support a scenario, modeling paradigm, problem domain or an entire methodology. Virtually any scenario in the software development problem space may be addressed, e.g., abstraction layers, modeling paradigms, programming languages, product layers, product architectures, vertical market domains, development lifecycle and code architectures. Project types could be linked together into larger hierarchies to support many more complex scenarios.

Model Elements—Nodes and Arcs

In general, visual representations such as icons and shapes rendered on the surface are collectively referred to as model elements, (or projections). In VMF, model elements are projected onto diagrams, (which in UML terminology is somewhat analogous to a projection being a single rendering of a model element on a view element). Each model element instance projected on a diagram corresponds to exactly one model element in a repository 208, however the same repository 208 model element may be projected onto multiple diagrams or even several times onto the same diagram.

A typical projection is implemented as a windowless ActiveX® control. Often the drawing notation and graphical behavior of the projection is handled directly by this control object. For very simple nodes, the control will also handle its own logical semantics. However, in accordance with one aspect of the present invention and as described below, this may be handled separately by a Notation Object owned by the projection control, and the control will own a separate SemanticObject to encapsulate this. Implementing a SemanticObject cleanly separates the logic of the object being projected (semantics) from the logic of the projection (notation). If a separate NotationObject and SemanticObject exist, they can be accessed through the VMENode (FIG. 8) or VMEArc (FIG. 9) interfaces, (via GetNotationObject() and GetSemanticObject() calls, respectively).

Figure 5:
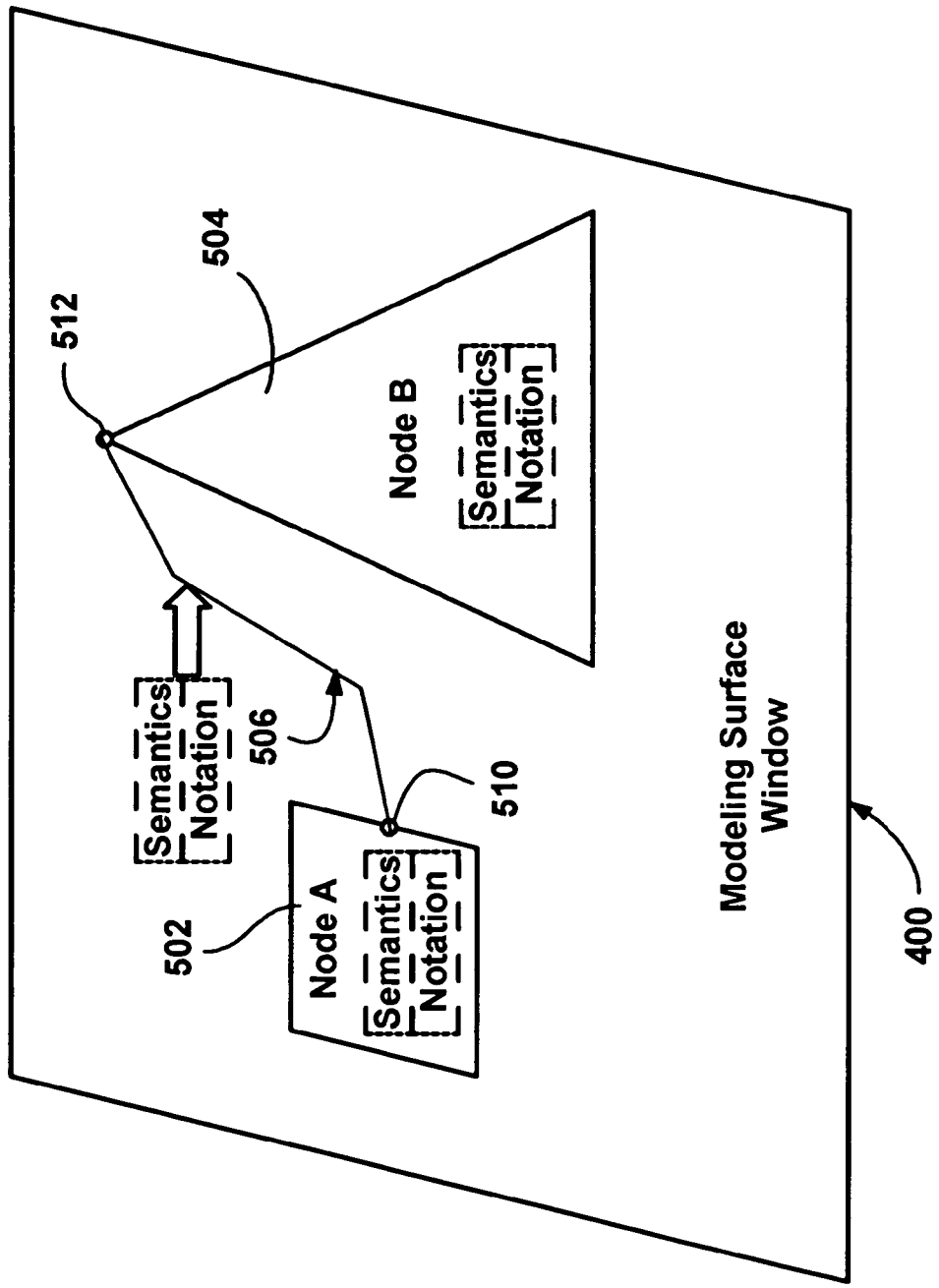
FIG. 5 is a representation of a modeling surface window having model elements thereon comprised of notations and semantics in accordance with an aspect of the present invention.
Figure 6:
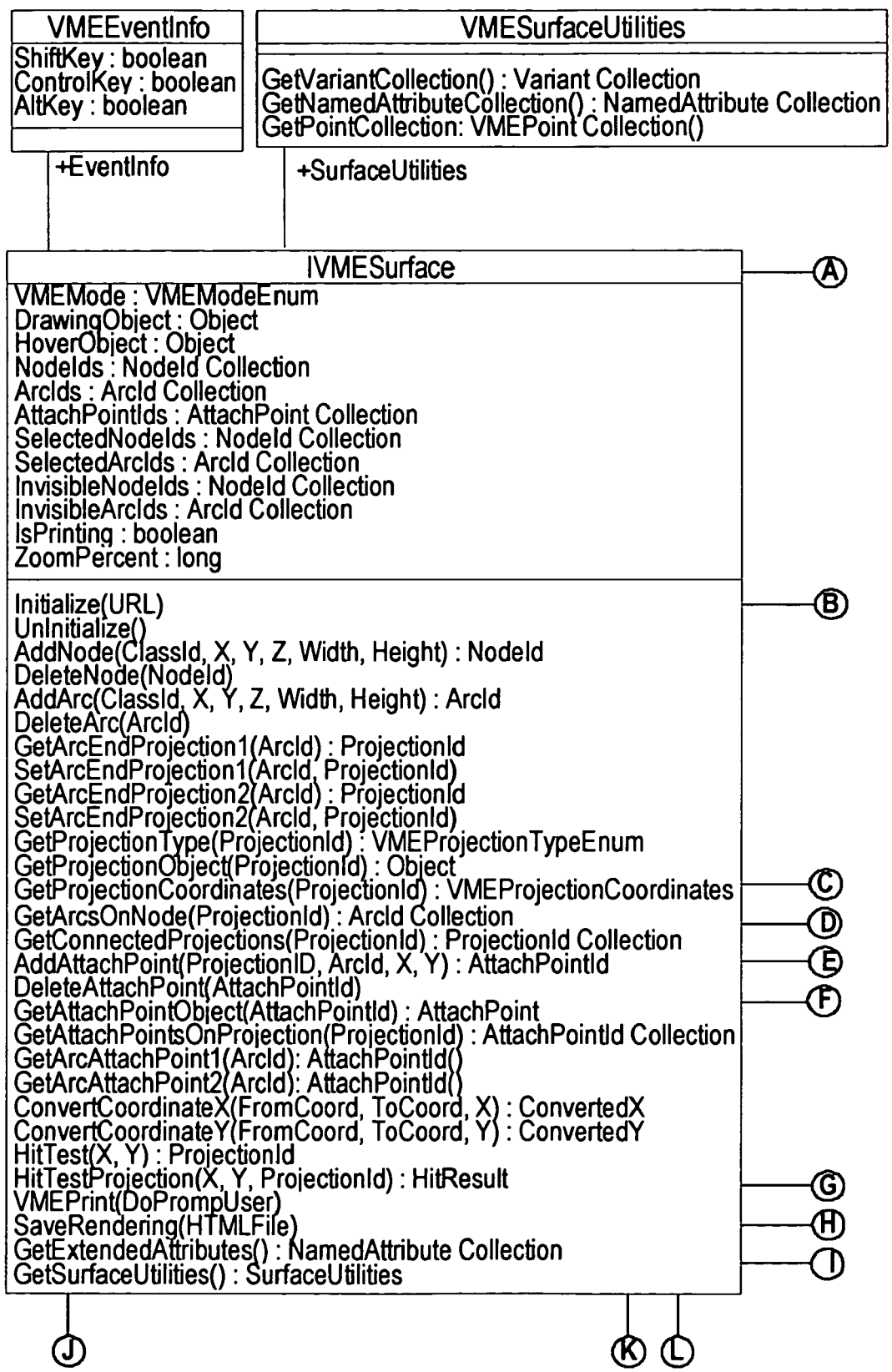
FIGS. 6-9 comprise a block diagram generally describing the VMF objects and certain functions, including interfaces and methods related to having separate semantics and notations in accordance with an aspect of the present invention.
Figure 7:
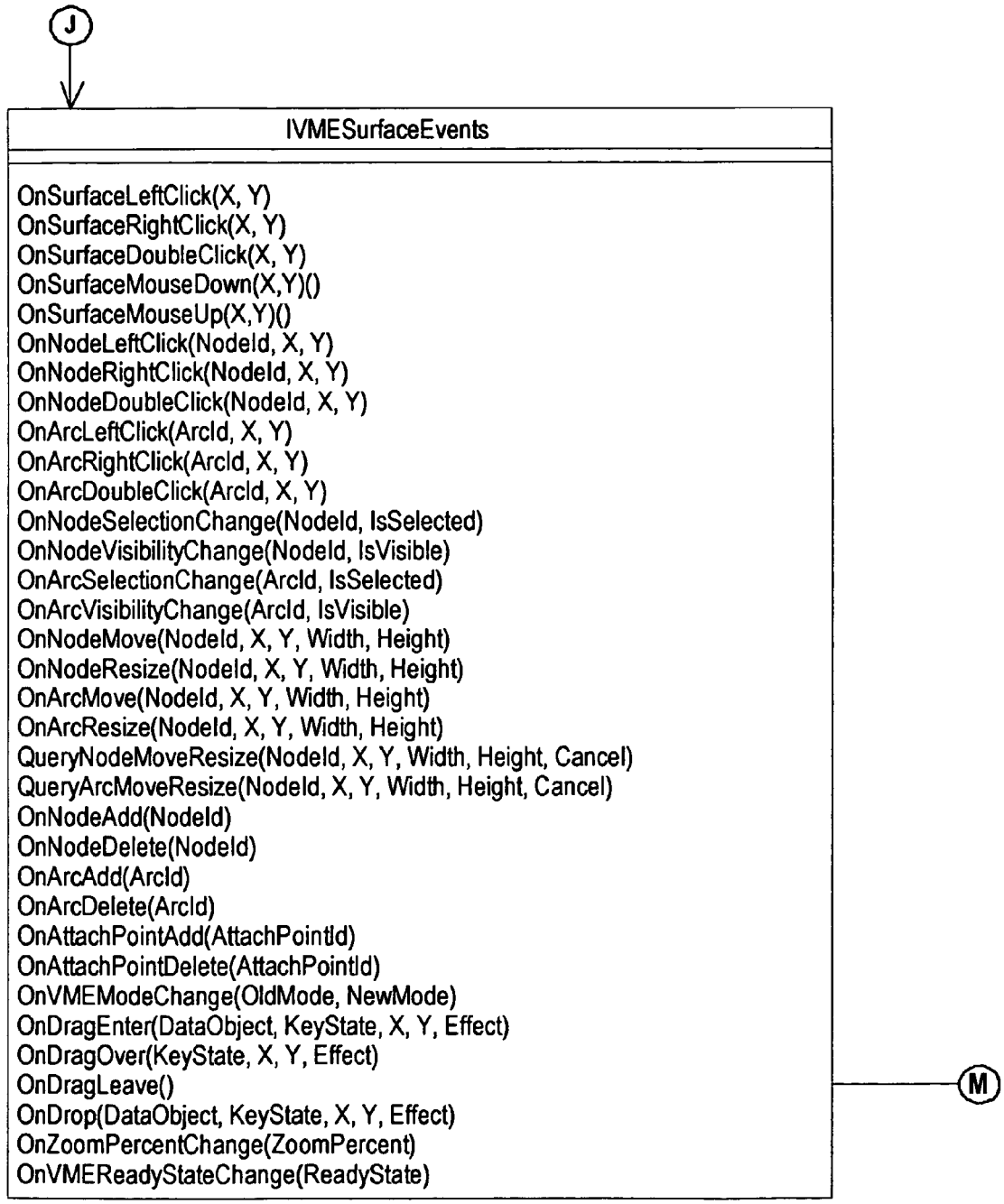
Figure 8:
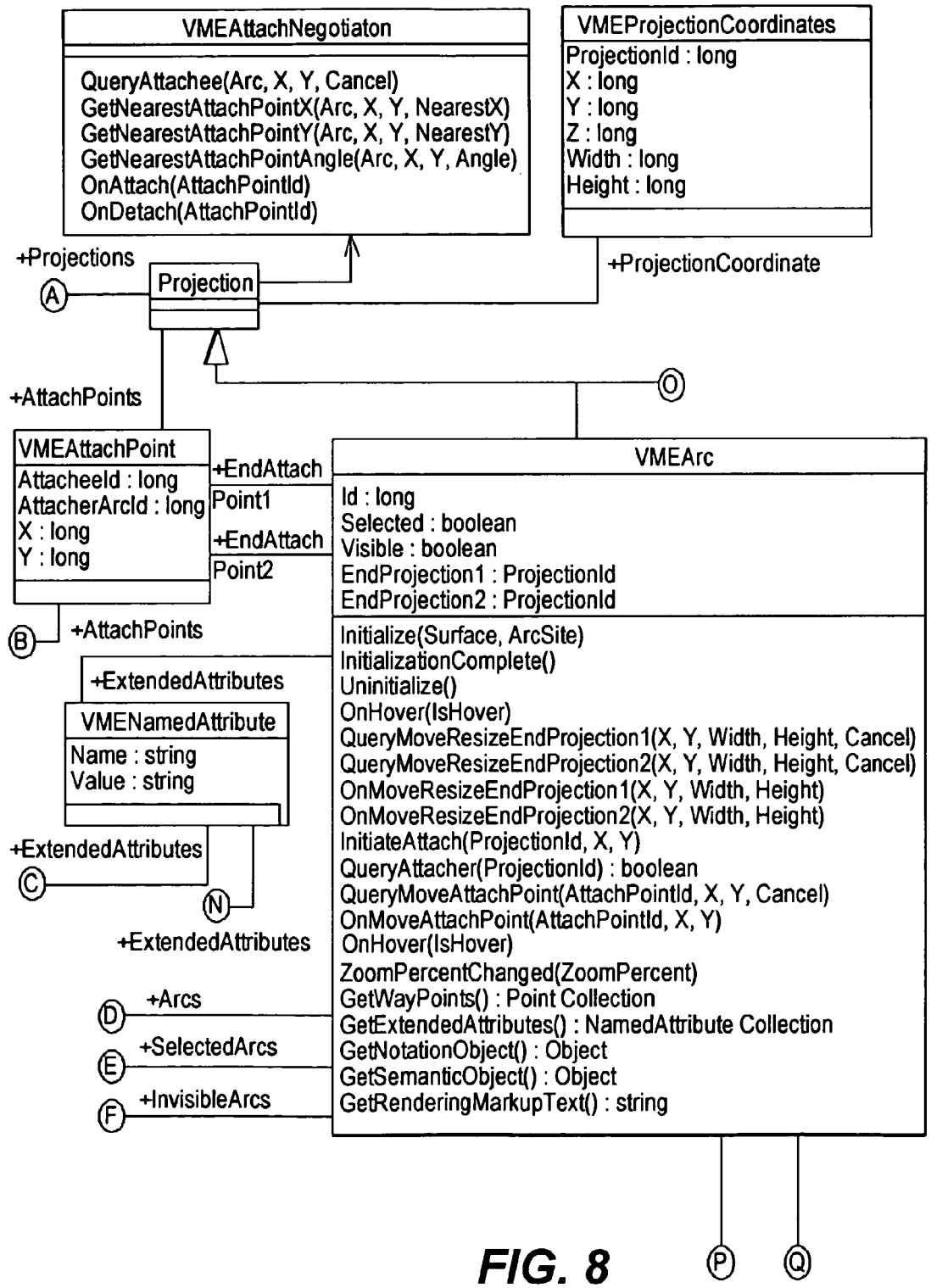
Figure 9:
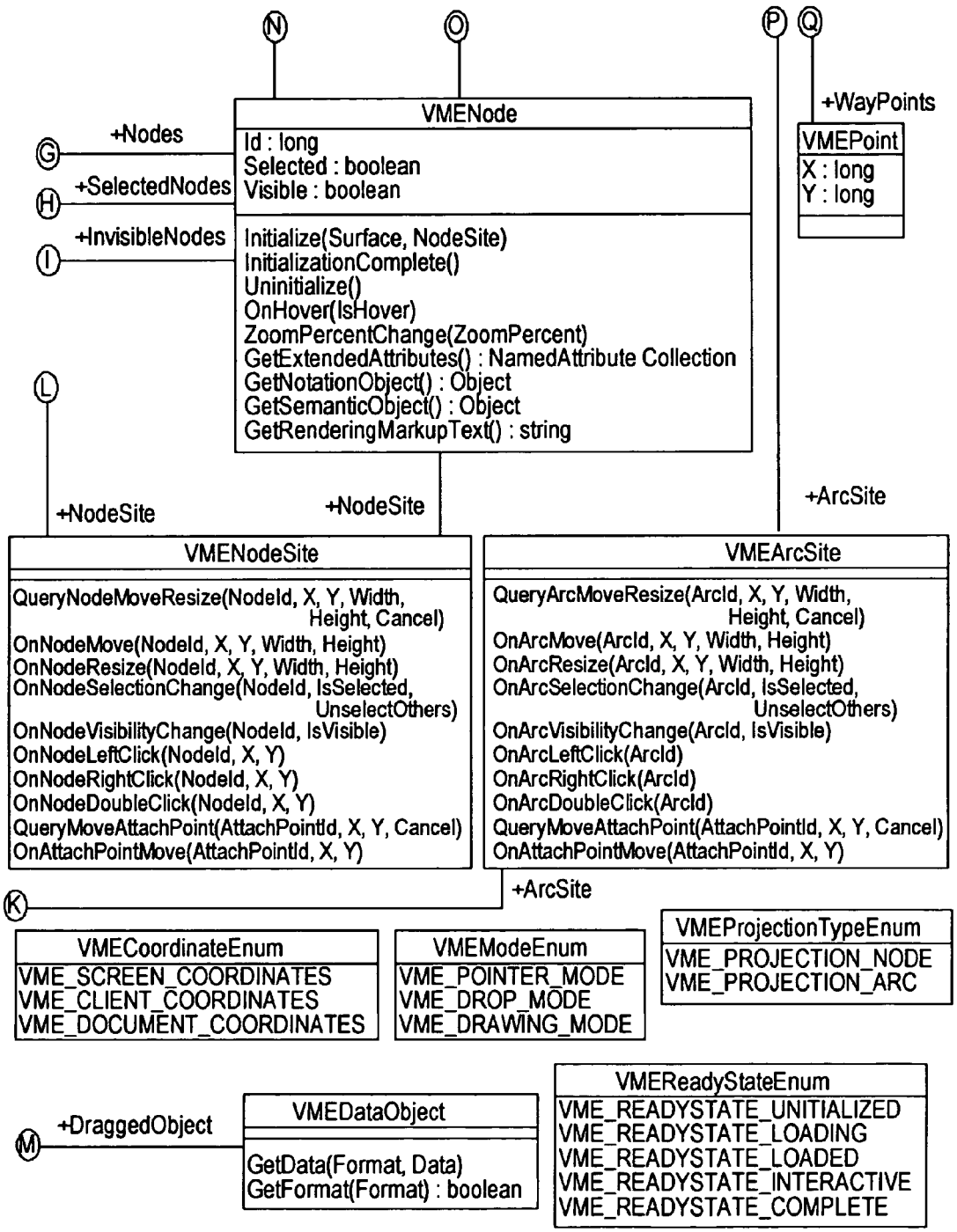

As generally represented in FIG. 5, each node 502, 504 is generally an icon, image, polygon, ellipse or other bounded shape, whereas an arc 506 is generally a line (possibly multi-segmented) that connects nodes (and sometimes other arcs) together. Arcs are used to connect two model elements together, semantically forming a relationship between the two. Model elements, which may be comprised of associated notations and semantics in accordance with an aspect of the present invention as described below, are typically peer ActiveX® controls on a window 400 of the surface 202. Properties of the model elements are persisted in the repository 208.

In one preferred embodiment, each model element in a modeling environment includes an ActiveX® control, (e.g., its notation). As such, each model element can autonomously control most of its presentation and much of its notational semantics. Usually, these controls will be light, windowless controls to improve scalability of models and therefore utilize the surface or graphic primitive server to provide basic windowing capability where required. Note that while the behavior of projects and diagrams is type-specific and is implemented in the project type, and the behavior of model elements and their projections is type-specific, and is implemented in one of the paradigm servers, the behavior of other elements is type-independent and is implemented in the surface server 202.

Each such model element thus also includes component interfaces, the primary purpose of which is to handle component communication between model elements, between a paradigm server and the model elements it serves, and between the surface and the model elements it contains. As described below, the notation and semantics that comprise a model element are each objects having such interfaces.

As also represented in FIG. 5, the exact point where the arc touches either of these nodes is known as the attach point. In FIG. 5, the two attach points are labeled 510 and 512. The two attach points are conceptually owned by the arc but are managed by the surface 202. For example, the surface uses the attach points to determine whether other model elements may be affected when a model element is moved or resized, e.g., if a node is moved, then all of the arcs attached to that node will need to move with it. However, the surface 202 cannot move the affected model elements when an attach point moves, because it has insufficient information about how those projections should react to this move. In such an instance, the surface 202 is responsible for raising events so that each of affected model elements can respond properly to the change.

Notations And Semantics

In accordance with one aspect of the present invention, a paradigm server (e.g., 206) may have some of its functionality separated into separate notation and semantic servers. In general, a notation server (e.g., 218) generally provides the visual representation (e.g., icons, images or shapes) of the paradigm, as well as the basic behaviors and rules for editing and connecting those visual representations. A semantic server (e.g., 220) provides direct access to the notation independent model (meta-data represented by the model).

To illustrate this separation more clearly, consider the following example, wherein the host is a Visual Basic add-in that facilitates generating class code automatically by drawing class models. This add-in readily allows switching between a Booch class modeling notation, where a class appears as a cloud shape, and the UML notation, where a class appears as a rounded-rectangle. A given code generator may require that the semantics of the class be restricted to that of VB classes. To make matters more complicated, this class control will be reused for a similar add-in for C++. In this scenario, the implementer of this node can cleanly separate the class node control from each of the two notation classes, and from the class of the VB class (SemanticObject).

To this end, notation servers (e.g., 218) may be implemented as VB or C++ custom control servers, or, for thin clients, they may comprise "behaviors" of the rendering engine 212. Semantic servers (e.g., 220) provide direct access to the notation independent model (meta-data represented by the model). This is particularly useful for non-graphical hosts, like wizards and generators. Semantic servers may be COM class servers or behaviors for thin clients.

The purpose of a paradigm server is to encapsulate the presentation and semantics of a modeling paradigm separate from the drawing surface and project types. This separation enables a high degree of flexibility and extensibility. To this end, there is one notation server (e.g., ActiveX® control) and one semantic server (e.g., COM class server) per modeling paradigm. For example, paradigm servers may be provided for IDEFIX physical schema, server topology, DTS packages, Storage Plus Types, Semantic Data Types, and Repository Information Models. One drawing paradigm server may be provided to serve non-semantic model elements, such as line, rectangle and label elements. Each server is registered to VMF, and as part of this registration, the library class for the server is identified.

A notation server is responsible for providing the graphic visual representations (e.g., icons, images, shapes or the like) and enforcing semantics of those visual representations that are strictly independent of the semantic objects represented by those visual representations (notational semantics). Notation servers supply a Library class component, a Toolbar ActiveX control component, and one or more model element ActiveX control components. The library class holds the global scope for the server. Any information that is server specific, but is not model element specific, can be acquired through the library class. Initializing the library class initializes the server including all shared memory for the server. Each paradigm server provides a toolbar to appear in the shell when the paradigm server is loaded. This toolbar control is actually provided to the shell through a property on the library class. Most of the toolbar buttons on this toolbar will correspond one-to-one with a model element the server can create. However, there may also be buttons for other tools the paradigm server can provide. For example, when a model element toolbar button is pressed, a new instance of that model element is provided to surface. This new instance will be placed at the next point on the surface that is clicked.

Semantic servers are is responsible for providing the COM classes that encapsulate the semantics being represented by a notation separate from the notation itself. In keeping with the present invention, this separation of semantics from notation enables, among other things, non-graphical clients (e.g., generators) to still be capable of accessing the semantics of the model.

The separation of the notation from the semantics thus allows different combinations (associations) of notations and semantics to be used as the modeling tool or the user sees fit. To enable the associating of the notation with the semantic, the objects implementing notational and semantic objects preferably comply with certain interfaces.

Notations implement interfaces that provide the following information, including that set forth in the table below:

---

(1) Library of notations to which the notation belongs, e.g., UML, IDEF and so forth).
(2) Type and Subtype of the notation.
(3) Name of the notation.
(4) Whether the notation is capable of being resized.
(5) Whether the notation is capable of visually indicating selected/unselected states.
(6) Whether the notation is capable of showing/hiding itself.
(7) Whether the notation is capable of visually indicating hover over/out as the cursor flies over to make interconnections.
(8) Whether the notation is capable of visually indicating attach-points at which arcs can connect.
(9) The minimum/maximum size of the notation.
(10) Whether the notation is capable of zooming itself.
(11) Supported color depths (e.g., 2 bit, 4 bit, 16 bit and so forth)
(12) The iconic representation (e.g., so that the notation can be put in a tool palette).
(13) Whether the notation is capable of doing animations. A separate interface needs to be supported if the notation supports animation.
(14) The number of states that the notation can visually indicate.

---

Further, notations include interfaces to effect changes in the notation based on what they support. For example, there may be other interfaces/methods to change size, position, selection, visibility, color, state of the notation and so forth, depending on each notation's capabilities.

Semantics implement interfaces that provide the following information, including that set forth in the table below:

---

(1) Library of notations to which the semantic object belongs, (e.g., VB, C++, Electrical connections and so forth).
(2) Type and Subtype of the semantic object.
(3) Name of the semantic object.
(4) Requires a resizable notation. Sizing has a meaning semantically.
(5) Requires notation capable of selected/unselected states.
(6) Requires notation capable of visible/hidden states.
(7) Requires notation capable of hover in/out states.
(8) Number of attach-points required.
(9) Color depth range required.
(10) Animation required. Number of animation states.
(11) Number of states required.

---

Semantics may also include domain-specific knowledge, which are implemented as separate interfaces specific to each domain. These interfaces are queried to accomplish domain-specific communication. Notation and semantic objects are found to be compatible by going through their interfaces. The VME paradigm server then makes the association between a notation and a semantic based on a tool or user preference.

Figure 10:
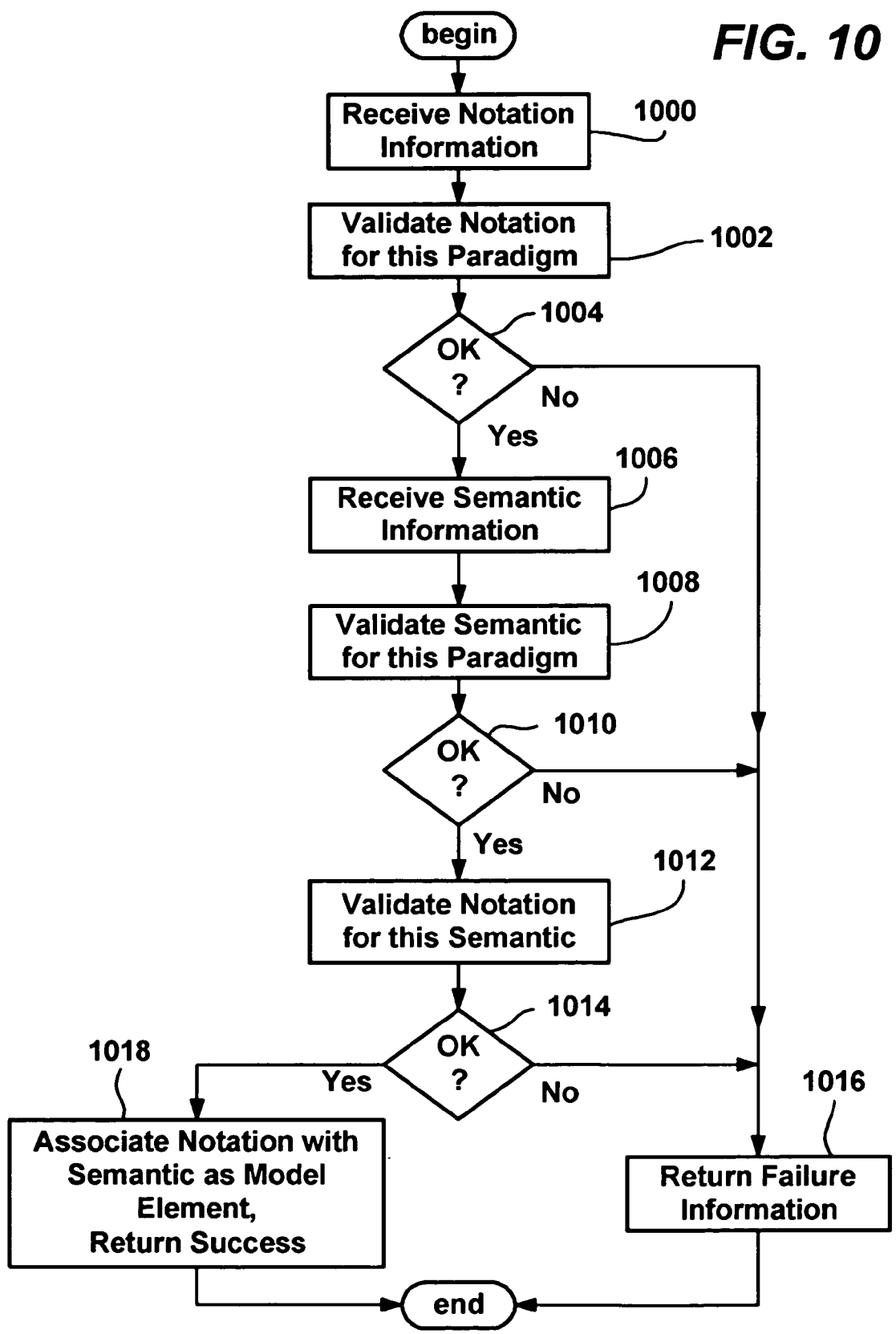
FIG. 10 comprises a logical flow diagram for associating a selected semantic with a selected notation to produce a model element in accordance with an aspect of the present invention.

By way of example, as represented in the flow diagram of FIG. 10, at step 1000 a paradigm server (e.g., 206) is provided with information about a notation object (e.g., 218) such as when selected by a user or the tool. At step 1002 and 1004, the paradigm server 206 validates the notation for this particular paradigm, by communicating with the notation object through its interfaces to determine its type, subtype, name, capabilities and/or any other type of information that it wants to know and can obtain from it. In essence, the validation performed at step 1002 evaluates the compatibility of the notation server (object) with the paradigm server. For example, a notation representing an electrical outlet will work with an electrical wiring paradigm, but not in a database design paradigm. Note however that in keeping with the present invention, a more generic notation may work with both, as the semantic object to which it connects may determine its meaning in the environment, e.g., a rectangular-shaped notation may be used in virtually any environment, with its meaning in a given environment dependent on its associated semantic. As represented by step 1004, the paradigm server either accepts or rejects this notation, returning either a failure indication (step 1016) or continuing if successfully validated, possibly returning success information for this phase.

Similar to the notation validation, at step 1006 a paradigm server (e.g., 206) is provided with information about a semantic object (e.g., 220) that is attempting to associate with the notation, such as when selected by a user or the tool. As represented by steps 1008 and 1010, the paradigm server 206 validates the semantic for this particular paradigm, by communicating with the semantic object through its interfaces to determine its type, subtype, name, capabilities and/or any other type of information that it wants to know and can obtain from it. As represented by step 1012, the paradigm server either accepts or rejects this semantic object, returning either a failure indication (step 1016) or continuing if successfully validated, possibly returning success information for this phase.

At step 1012, a determination is made as to whether the notation and semantic servers can be associated with one another. For example, as set forth above, the semantic server may have certain requirements about the notation server, e.g., the notation server may have to be resizable or it is not compatible with the semantic server. The paradigm server 206 can make this determination, or alternatively, the paradigm server can provide the interfaces of each to one another, whereby the semantic and notation objects can determine compatibility themselves. In any event, step 1014 represents the compatibility test, which either results in a failure as represented by step 1016, or success, whereby the notation is associated with the semantic, thereby providing a model element as represented by step 1018.

Note that in FIG. 10, the actual order in which compatibility among the paradigm server, notation server and semantic server is checked, or the order in which object information is received is not important. For example, the semantic object can be selected and checked prior to checking the notation object, or even essentially at the same time.

As can be seen from the foregoing detailed description, there is provided a separation of notations and semantics and later selective re-association thereof that eliminates many of the drawbacks of the prior art. Via separate notations and semantics, the present invention provides significant flexibility and extensibility, e.g., as new types of components are developed or as requirements change, new notations and semantics can be developed to handle them. Moreover, a notation or semantic developed and/or used in one environment may be used in a different environment.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. In a computing environment for use in computer implemented modeling, a method of creating a model element, the method comprising:
   selecting a notation from a plurality of notations, wherein each of the notations among the plurality of notations comprise a visual representation which may be used as a visual representation of a model element, and wherein each notation comprises one or more interfaces that provide information about capabilities of the notation for use in associating a notation with a semantic, but wherein each notation is independent of any semantic;
   selecting a semantic, the semantic providing a meaning of a model element in a modeling environment, and the semantic being independent from any notation, the semantic having one or more interfaces for accessing information about the semantic defining requirements of a notation that is to be associated with the selected semantic; and
   associating the selected notation with the selected semantic by associating the capabilities of the notation with the requirements of the semantic, where associating the selected notation with the selected semantic comprises:
   validating the notation for a paradigm;
   validating the semantic for the paradigm; and
   validating through the notation and semantic interfaces that the notation has capabilities to meet the requirements of the semantic.

2. The method of claim 1 wherein the notation comprises a notation object and the semantic comprises a semantic object, and wherein a paradigm server associates the notation object with the semantic object to provide the model element.

3. The method of claim 2 wherein the paradigm server validates that the semantic object can be associated with the notation object.

4. The method of claim 1 wherein one of the interfaces of the notation provides information identifying a library of notations to which the notation belongs.

5. The method of claim 1 wherein one of the interfaces of the notation provides type information corresponding to the notation.

6. The method of claim 1 wherein one of the interfaces of the notation provides subtype information corresponding to the notation.

7. The method of claim 1 wherein one of the interfaces of the notation provides a name of the notation.

8. The method of claim 1 wherein one of the interfaces of the notation provides information indicative of whether the notation is capable of being resized.

9. The method of claim 1 wherein one of the interfaces of the notation provides information indicative of whether the notation is capable of visually indicating selected and unselected states.

10. The method of claim 1 wherein one of the interfaces of the notation provides information indicative of whether the notation is capable of being in a visible or a hidden state.

11. The method of claim 1 wherein one of the interfaces of the notation provides information indicative of whether the notation is capable of visually indicating hover-related states.

12. The method of claim 1 wherein one of the interfaces of the notation provides information indicative of whether the notation is capable of visually indicating attach-points at which arcs can connect.

13. The method of claim 1 wherein one of the interfaces of the notation provides information indicative of a minimum and maximum size of the notation.

14. The method of claim 1 wherein one of the interfaces of the notation provides information indicative of whether the notation is capable of zooming operations.

15. The method of claim 1 wherein one of the interfaces of the notation provides information indicative of supported color depths.

16. The method of claim 1 wherein one of the interfaces of the notation provides information indicative of an iconic representation.

17. The computer readable method of claim 1 wherein one of the interfaces of the notation provides information indicative of whether the notation is capable of doing animations.

18. The method of claim 1 wherein one of the interfaces of the notation provides information indicative of a number of states that the notation can visually indicate.

19. The method of claim 1 wherein one of the interfaces of the semantic provides information identifying a library of semantics to which the semantic belongs.

20. The method of claim 1 wherein one of the interfaces of the semantic provides type information corresponding to the semantic.

21. The method of claim 1 wherein one of the interfaces of the semantic provides subtype information corresponding to the semantic.

22. The method of claim 1 wherein one of the interfaces of the semantic provides a name of the semantic.

23. The method of claim 1 wherein one requirement of the semantic requires that the notation be resizable.

24. The method of claim 1 wherein one requirement of the semantic requires that the notation be capable of visually indicating a selected or an unselected state.

25. The method of claim 1 wherein one requirement of the semantic requires that the notation be capable of being in a visible or a hidden state.

26. The method of claim 1 wherein one requirement of the semantic requires that the notation be capable of visually indicating at least two distinct hover-related states.

27. The method of claim 1 wherein one requirement of the semantic requires that the notation have a number of attach-points at which arcs can connect.

28. The method of claim 1 wherein one requirement of the semantic requires that the notation support a color depth.

29. The method of claim 1 wherein one requirement of the semantic requires that the notation be capable of doing animations.

30. The method of claim 1 wherein one requirement of the semantic requires that the notation have a number of states.

31. The method of claim 1 wherein the model element corresponds to a node, and wherein the node includes at least one method to determine the notation and semantic and corresponding thereto.

32. The method of claim 1 wherein the model element corresponds to an arc, and wherein the arc includes at least one method to determine the notation and semantic and corresponding thereto.

33. A system, comprising:
  a notation server, wherein the notation server stores a plurality of notations, wherein each of the notations among the plurality of notations comprise a visual representation which may be used as a visual representation of a model element, and wherein each notation comprises one or more interfaces that provide information about capabilities of the notation for use in associating a notation with a semantic, but wherein each notation is independent of any semantic;
  a semantic server, wherein the semantic server stores one or more semantics, each semantic providing a meaning of a model element in a modeling environment, and the semantic being independent from any notation, the semantic having one or more interfaces for accessing information about the semantic defining requirements of a notation that is to be associated with the selected semantic; and
  a paradigm server, the server coupled to the notation server and the semantic server connected to a modeling environment and configured to access the interfaces of the notation and the interfaces of the semantic, and further configured to enable a determination as to whether the paradigm server, notation and semantic are each compatible, and if they are compatible, to associate the notation with the semantic by associating capabilities of the notation with requirements of the semantic to provide a model element in the modeling environment, where associating the selected notation with the selected semantic comprises:
  validating the notation for a paradigm;
  validating the semantic for the paradigm; and
  validating through the notation and semantic interfaces that the notation has capabilities to meet the requirements of the semantic.

34. The system of claim 33 wherein the semantic server comprises a component object model class server.

35. A computer-readable storage medium having stored thereon computer executable instructions for performing the following:
  selecting a notation from a plurality of notations, wherein each of the notations among the plurality of notations comprise a visual representation which may be used as a visual representation of a model element, and wherein each notation comprises one or more interfaces that provide information about capabilities of the notation for use in associating a notation with a semantic, but wherein each notation is independent of any semantic;
  selecting a semantic, the semantic providing a meaning of a model element in a modeling environment, and the semantic being independent from any notation, the semantic having one or more interfaces for accessing information about the semantic defining requirements of a notation that is to be associated with the selected semantic; and
  associating the selected notation with the selected semantic by associating the capabilities of the notation with the requirements of the semantic, where associating the selected notation with the selected semantic comprises:
  validating the notation for a paradigm;
  validating the semantic for the paradigm; and
  validating through the notation and semantic interfaces that the notation has capabilities to meet the requirements of the semantic.

* * * * *